(12) United States Patent
Tanaka

(10) Patent No.: US 9,015,637 B2
(45) Date of Patent: Apr. 21, 2015

(54) PORTABLE COMMUNICATION TERMINAL, BROWSING METHOD, AND BROWSING PROGRAM

(75) Inventor: Hideaki Tanaka, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 893 days.

(21) Appl. No.: 12/522,821

(22) PCT Filed: Jan. 8, 2008

(86) PCT No.: PCT/JP2008/050051
§ 371 (c)(1),
(2), (4) Date: Jul. 10, 2009

(87) PCT Pub. No.: WO2008/087871
PCT Pub. Date: Jul. 24, 2008

(65) Prior Publication Data
US 2010/0146456 A1 Jun. 10, 2010

(30) Foreign Application Priority Data
Jan. 15, 2007 (JP) .................. 2007-005552

(51) Int. Cl.
G06F 3/048 (2013.01)
G06F 3/0489 (2013.01)
G06F 3/0482 (2013.01)
G06F 3/0485 (2013.01)

(52) U.S. Cl.
CPC .......... *G06F 3/04892* (2013.01); *G06F 3/0482* (2013.01); *G06F 3/0485* (2013.01)

(58) Field of Classification Search
USPC ............................ 715/862, 864, 729, 781, 784
See application file for complete search history.

(56) References Cited

U.S. PATENT DOCUMENTS 5,075,673 A 12/1991 Yanker
5,757,381 A * 5/1998 Shoji et al. ................ 345/684
(Continued)

FOREIGN PATENT DOCUMENTS

JP 3-25679 A 2/1991
JP 1993134653 A 5/1993
(Continued)

OTHER PUBLICATIONS

Supplementary European Search Report for EP 08 70 2932 issued Feb. 1, 2010.
(Continued)

*Primary Examiner* — Anil Bhargava
(74) *Attorney, Agent, or Firm* — Sughrue Mion, PLLC

(57) ABSTRACT

A browsing method capable of performing mutual switching between in-site browsing and in-screen browsing without making a user aware of the switching is provided. Control unit causes superimposed display of a web page and a pointer that moves according to operations on a pointing device 3 and a cross key 4 on display 2 in the in-screen browsing, and changes a region of the web page to be displayed on the display 2 when the pointer moves outside the region. The control unit changes the region of the web page to be displayed on the display 2 according to the operations performed on the pointing device 3 and the cross key 4 in the in-site browsing. Then, the control unit causes transition from the in-screen browsing to the in-site browsing, and causes transition from the in-site browsing from the in-screen browsing.

11 Claims, 8 Drawing Sheets

(56) References Cited

U.S. PATENT DOCUMENTS

| | | | | |
|---|---|---|---|---|
| 6,031,531 | A * | 2/2000 | Kimble | 715/862 |
| 6,211,879 | B1 | 4/2001 | Soohoo | |
| 6,278,443 | B1 * | 8/2001 | Amro et al. | 345/173 |
| 6,717,600 | B2 * | 4/2004 | Dutta et al. | 715/862 |
| 7,027,038 | B2 * | 4/2006 | Carro | 345/173 |
| 2002/0158908 | A1 * | 10/2002 | Vaajala et al. | 345/767 |
| 2003/0074635 | A1 * | 4/2003 | Cao | 715/513 |
| 2006/0048071 | A1 * | 3/2006 | Jarrett et al. | 715/784 |
| 2006/0048072 | A1 * | 3/2006 | Jarrett et al. | 715/784 |
| 2006/0265653 | A1 * | 11/2006 | Paasonen et al. | 715/704 |
| 2007/0033543 | A1 * | 2/2007 | Ngari et al. | 715/788 |
| 2007/0188473 | A1 * | 8/2007 | Anwar | 345/173 |
| 2008/0034316 | A1 * | 2/2008 | Thoresson | 715/781 |

FOREIGN PATENT DOCUMENTS

| | | |
|---|---|---|
| JP | 2003308168 A | 10/2003 |
| JP | 2004086744 A | 3/2004 |
| JP | 2004312476 A | 11/2004 |

OTHER PUBLICATIONS

G. Grassel et al., "The Nokia Open Source Brower", Proceedings of the MOBEA IV—Empowering the Mobile Web, [Online] May 23, 2006, XP002561587.

International Search Report for PCT/JP2008/050051 mailed Feb. 5, 2008.

Office Action, dated Jun. 24, 2014, issued by the Japanese Patent Office, in counterpart Application No. 2013-181001.

* cited by examiner

PORTABLE COMMUNICATION TERMINAL, BROWSING METHOD, AND BROWSING PROGRAM

This application is the National Phase of PCT/JP2008/050051, filed Jan. 8, 2008, which is based upon and claims the benefit of the priority of Japanese patent application No. 2007-005552, filed on Jan. 15, 2007, the disclosure of which is incorporated herein in its entirety by reference thereto.

TECHNICAL FIELD

The present invention relates to a portable communication terminal including display means for displaying an image and a text, a web browsing method, and a web browsing program.

BACKGROUND ART

Among conventional methods of changing (moving) a region of an image or the like to be displayed on the screen of a cellular phone, there is a method of performing superimposed display of the image or the like and a pointer on the screen of the cellular phone and moving (scrolling) every line of a portion of an image or the like to be displayed on the screen, at a timing when the pointer moves outside the screen (hereinafter described as in-screen browsing).

Further, there is a method of moving (scrolling) every line of the portion of the image or the like to be displayed on the screen, according to operations performed on a pointing device and a cross key provided at the cellular phone (hereinafter described as in-site browsing).

Each of Patent Documents 1 and 2 describes a cellular phone including a pointing device.
[Patent Document 1]
  JP Patent Kokai Publication No. JP-P2004-312476A (paragraphs 0015 to 0047, FIG. 1)
[Patent Document 2]
  JP Patent Kokai Publication No. JP-P2003-308168A (paragraphs 0011 to 0061, FIG. 1)

SUMMARY

The entire disclosure of Patent Documents 1 and 2 described above is incorporated herein by reference thereto.

In the in-screen browsing, an operation of anchoring to a link is readily performed. However, there is a problem that the region to be displayed cannot be smoothly moved outside the screen. The link is referred to as a scheme that mutually connects web pages, text files, image data, and speech data inside documents. An anchor is an element (tag) set for a hyperlink (simply referred to as the link as well) in an HTML (Hyper Text Markup Language).

In the in-site browsing, the screen can be smoothly moved when the Neropointer (trade mark) is used, for example. However, there is a problem that a displayed item such as the anchor is difficult to point (select).

Accordingly, an object of the present invention is to provide a portable communication terminal, a browsing method, and a browsing program capable of mutually performing switching between in-site browsing and in-screen browsing without making a user aware of the switching.

According to a first aspect of the present invention, there is provided a portable communication terminal including a display unit displaying information targeted for browsing (such as a web page) on a screen thereof. The portable communication terminal includes:

an instruction unit instructing a region of the information targeted for browsing to be displayed on the display unit according to an operation performed by a user; and a control unit causing the region of the information targeted for browsing corresponding to the operation performed on the instruction unit to be displayed on the display unit. The control unit causes, in a first state, superimposed display of the information targeted for browsing and a pointer that moves according to the operation performed on the instruction unit on the display unit and changes the region of the information targeted for browsing to be displayed on the display unit when the pointer moves outside the region. The control unit changes, in a second state, the region of the information targeted for browsing to be displayed on the display unit according to the operation performed on the instruction unit. Further, the control unit includes state transition unit causing transition from the first state to the second state and causing transition from the second state to the first state.

The control unit may change the region of the information targeted for browsing to be displayed on the display unit when the pointer moves outside the region in the first state. The state transition unit may cause transition to the second state when the pointer moves outside the region in the first state.

The state transition unit may cause transition to the first state when the operation performed on the instruction unit is finished in the second state.

According to a second aspect of the present invention, there is provided a browsing method of displaying information targeted for browsing on a screen of display apparatus according to an operation performed on instruction unit by a user. The method includes a control step of displaying on the display apparatus a region of the information targeted for browsing corresponding to the operation performed on the instruction unit. In a first state of the control step, superimposed display of the information targeted for browsing and a pointer that moves according to the operation performed on a screen of the display apparatus is made on the screen of the display apparatus, and the region of the information targeted for browsing to be displayed on the screen of the display apparatus is changed when the pointer moves outside the region. In a second state of the control step, the region of the information to be displayed on the screen of the display apparatus is changed, according to the operation performed on the instruction unit. The method further includes a transition step of changing the region of the information targeted for browsing to be displayed on the screen of the display apparatus when the pointer moves outside the region in the first state, thereby causing transition to the second state, and causing transition to the first state when the operation performed on the instruction unit is finished in the second state.

According to a third aspect of the present invention, there is provided a browsing program installed in a portable communication terminal including display unit displaying information targeted for browsing on a screen thereof. The browsing program causes a computer to execute a control process that causes a region of the information targeted for browsing corresponding to an operation performed on instruction unit by a user to be displayed on the display unit. In a first state of the control process, superimposed display of the information targeted for browsing and a pointer that moves according to the operation performed on the instruction unit is made on the display unit, and the region of the information targeted for browsing to be displayed on the display unit is changed when the pointer moves outside the region. In a second state of the control process, the region of the information targeted for browsing to be displayed on the display unit is changed according to the operation performed on the instruction unit.

The program may cause the computer to execute the control process so that when the pointer moves outside the region in the first state, the region of the information to be displayed on the display unit is changed, thereby causing transition to the second state, and when the operation performed on the instruction unit is finished in the second state, transition to the first state is caused.

According to a fourth aspect of the present invention, there is provided a portable terminal capable of performing switching when information targeted for browsing that cannot be held in a display region is displayed. The switching is performed between:

a first browsing mode in which, when a pointer operated by a user moves outside the display region, a location of the display region of the information targeted for browsing is moved; and a second browsing mode in which the location of the display region of the information targeted for browsing is moved according to an operation amount of the user.

According to a fifth aspect of the present invention, there is provided a browsing program installed in a portable terminal and executed by a computer. When information targeted for browsing and having a size that cannot be held in a display region of the portable terminal is displayed, the browsing program implements a function of performing switching. The switching is performed between:

a first browsing mode in which, when a pointer operated by a user is moved outside the display region, a location of the display region of the information targeted for browsing is moved; and a second browsing mode in which the display region is moved according to an operation amount of the user.

According to the present invention, mutual transition between the first state (in-screen browsing) and the second state (in-site browsing) is made. In the first state, the region to be displayed on the display unit is changed when the pointer moves outside the region. In the second state, the region to be displayed on the display unit is changed according to the operation on the instruction unit. In the first state, an operation of readily anchoring to a link can be performed. In the second state, the screen can be smoothly moved.

The state transition unit causes transition to the second state when the pointer moves outside the region in the first state. Further, when the operation performed on the instruction unit is finished in the second state, the state transition unit causes transition to the first state. Thus, the in-site browsing and the in-screen browsing can be mutually switched, without making the user aware of the switching.

PREFERRED EXEMPLARY EMBODIMENTS

Figure 1:
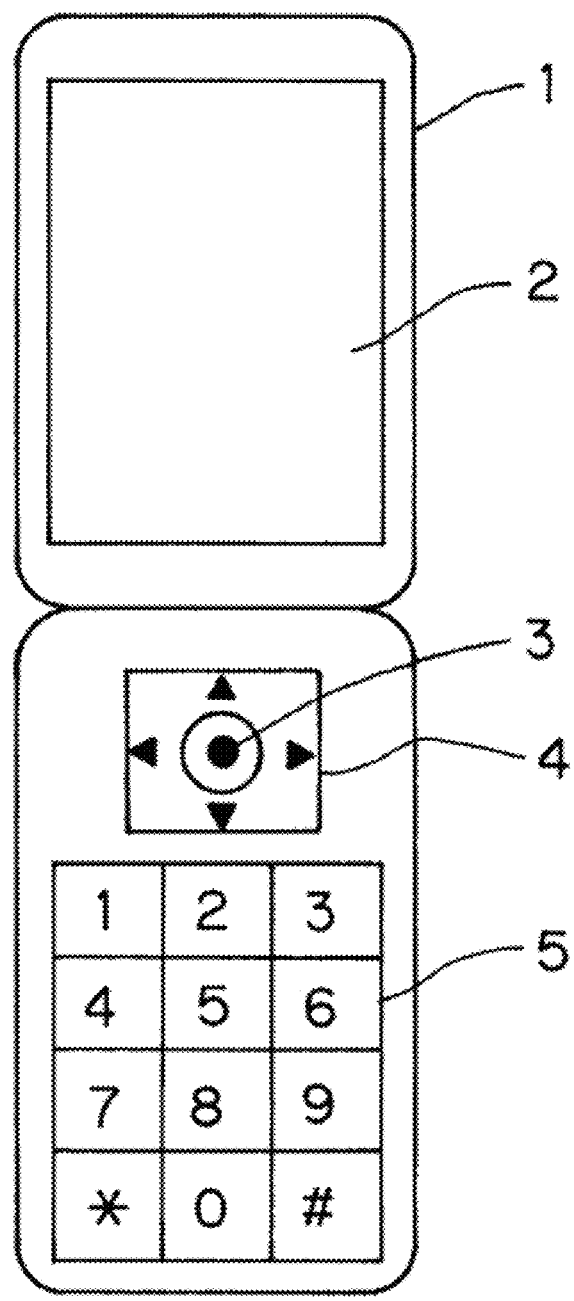
FIG. 1 is an explanatory diagram showing an outward appearance of a cellular phone that displays information targeted for browsing by a browsing method according to the present invention.

An exemplary embodiment of a browsing method according to the present invention will be described with reference to drawings. FIG. 1 is an explanatory diagram showing an outward appearance of a cellular phone 1 including display unit capable of displaying information (such as an image) targeted for browsing by the browsing method according to the present invention. In the following description, a case where a web page is displayed will be used as an example. Accordingly, the browsing method will be referred to as a web browsing method.

The cellular phone (portable communication terminal) 1 shown in FIG. 1 includes a display (display unit) 2, a pointing device 3, a cross key 4, and dial keys 5. Instruction unit is implemented by the pointing device 3 and the cross key 4.

The display 2 is an LCD (Liquid Crystal Display) or the like, for example. The display 2 performs superimposed display of information (web page in this exemplary embodiment) and a pointer according to control of control unit (not shown) included in the cellular phone 1. The display 2 is also referred to as a screen.

The pointing device 3 is a projecting portion (convex portion) provided at the cellular phone 1. The pointing device 3 instructs movement of a region of the web page to be displayed on the screen or instructs movement of a pointer according to an operation of a user. The cross key 4 is constituted from buttons provided at the cellular phone 1. The cross key 4 instructs movement of the region of the web page to be displayed on the screen or instructs movement of the pointer according to an operation of the user. In the example in FIG. 1, the cross key 4 includes an "up button", a "down button", a "left button", and a "right button".

Control unit (state transition unit) causes information (web page in this exemplary embodiment) to be displayed on the screen (display 2) according to operations performed on the pointing device 3 and the cross key 4 by the user. Further, the control unit changes a position at which the pointer is displayed according to the operations performed on the pointing device 3 and the cross key 4 by the user. Incidentally, the pointer is a character (such as a symbol in the form of an arrow) that is moved according to the operations performed on the pointing device 3 and the cross key 4 by the user.

According to the operation of the user, the pointing device 3 is slid or inclined in each direction of a surface of the cellular phone 1 where the pointing device 3 is provided. Then, the control unit changes the position at which the pointer is displayed or changes the region of the web page to be displayed on the screen in the direction where the pointing device 3 is slid or inclined.

The dial keys 5 are buttons for supplying a telephone number or the like of a transmitting destination into the cellular phone 1.

The cellular phone 1 includes a web browsing program for causing a computer to executes a control process that displays a region of the web page on the display 2 corresponding to the operations performed on the pointing device 3 and the cross key 4. In a first state (in-screen browsing) of the control process, superimposed display of the web page and the pointer that moves according to the operations performed on the pointing device 3 and the cross key 4 is performed on the display 2. When the pointer moves outside the region, the region of the web page to be displayed on the display 2 is changed. In a second state (in-site browsing) of the control process, the region of the web page to be displayed on the display 2 is changed according to the operations performed on the pointing device 3 and the cross key 4.

FIGS. 2A to 2D are explanatory diagrams showing a case where a region to be displayed on the screen is changed (moved) by the in-screen browsing.

Figure 2A:
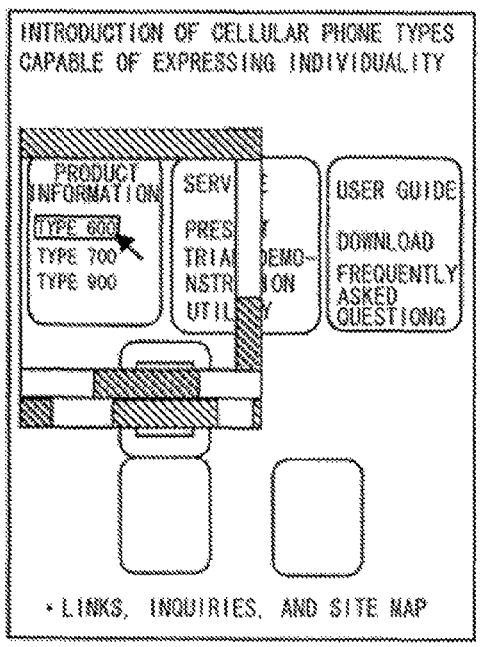
FIGS. 2A to 2D are explanatory diagrams showing a case where a region to be displayed on a screen is changed (moved) by in-screen browsing.

As shown in FIG. 2A, the control unit causes superimposed display of information within a predetermined range (within a window display frame) of the web page and the pointer on the window. In the example shown in FIG. 2A, the window display frame is indicated by oblique lines or the like.

Figure 2B:
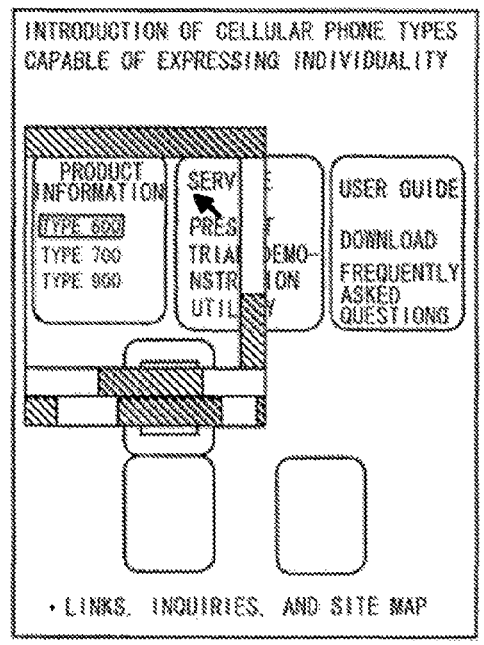

When the user performs the operation that causes the pointing device 3 to slide to the right and depresses the right button included in the cross key 4, the control unit changes the position at which the pointer is displayed to the right, as shown in FIG. 2B.

Figure 2C:
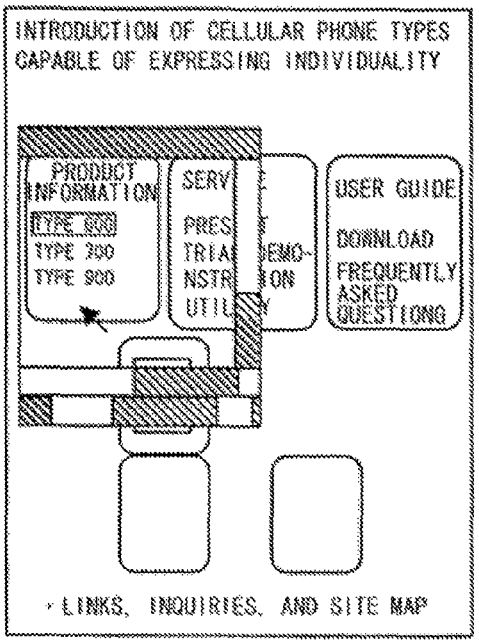

When the user performs the operation that causes the pointing device 3 to slide downward and depresses the down button included in the cross key 4, the control unit changes the position at which the pointer is displayed downwards, as shown in FIG. 2C.

Figure 2D:
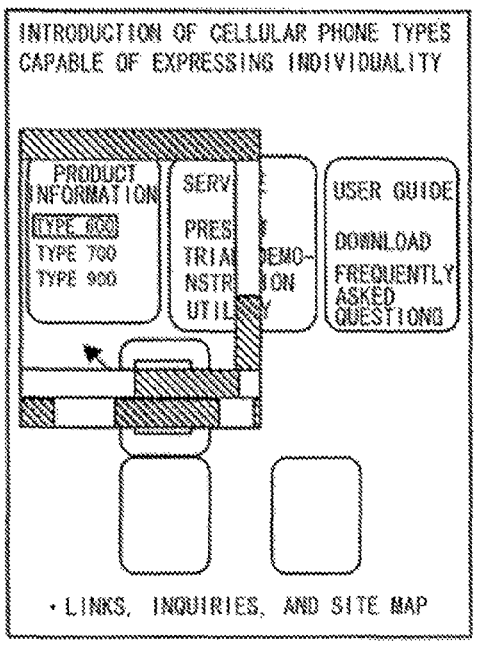

Further, when the user performs the operation that causes the pointing device 3 to slide downward and depresses the down button included in the cross key 4 to move the pointer outside the predetermined range (outside the window display frame), the control unit moves the region of the web page to be displayed on the screen downwards, as shown in FIG. 2D. That is, the window display frame is moved downward.

FIGS. 3A to 3D are explanatory diagrams showing a case where the region to be displayed on the screen is changed (moved) by the in-site browsing.

Figure 3A:
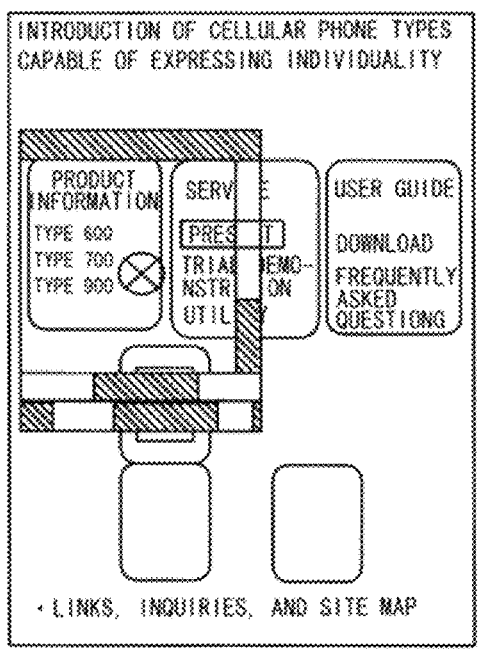
FIGS. 3A to 3D are explanatory diagrams showing a case where the region to be displayed on the screen is changed (moved) by in-site browsing.

As shown in FIG. 3A, the control unit causes the information of the web page in the predetermined range (within the window display frame) to be displayed on the screen, as shown in FIG. 3A.

Figure 3B:
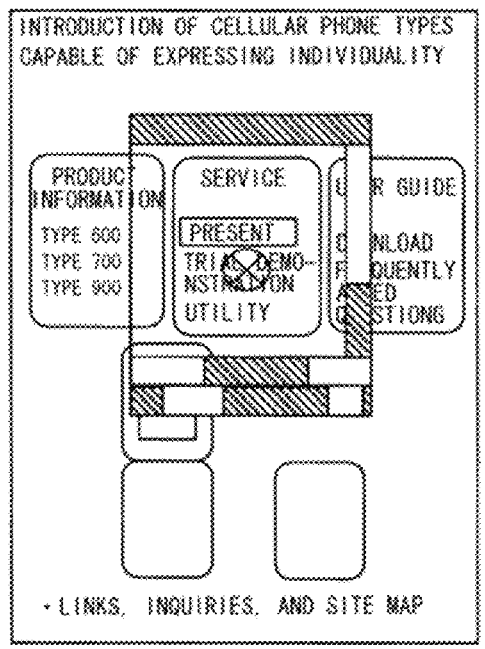

When the user performs the operation that causes the pointing device 3 to slide to the right and depresses the right button included in the cross key 4, the control unit moves the region of the web page to be displayed on the screen to the right, as shown in FIG. 3B. That is, the window display frame is moved to the right.

Figure 3C:
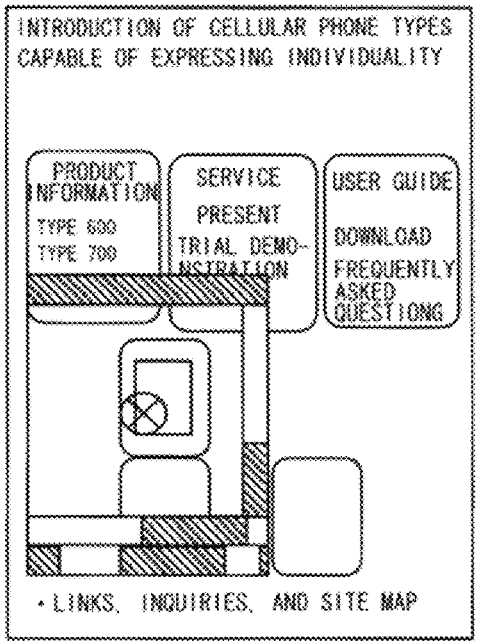

When the user performs the operation that causes the pointing device 3 to slide downward or depresses the down button included in the cross key 4, the control unit moves the region of the web page to be displayed on the screen downward, as shown in FIG. 3C. That is, the window display frame is moved downward.

Figure 3D:
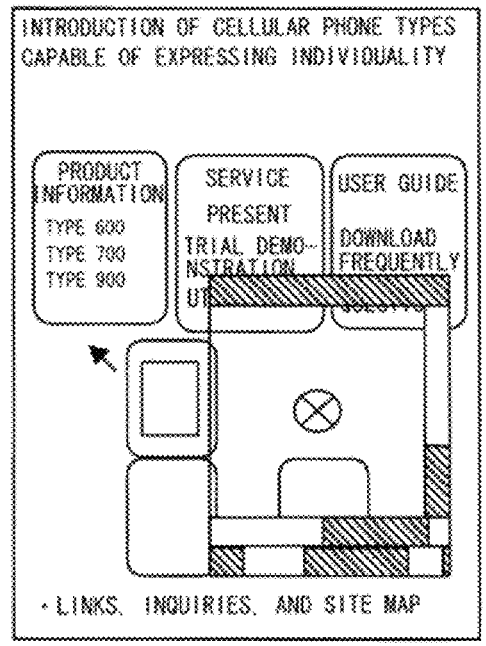

Further, when the user performs the operation that causes the pointing device 3 to slide to the right or depresses the right button included in the cross key 4, the control unit moves the region of the web page to be displayed on the screen to the right, as shown in FIG. 3D. That is, the window display frame is moved to the right.

Figure 4:
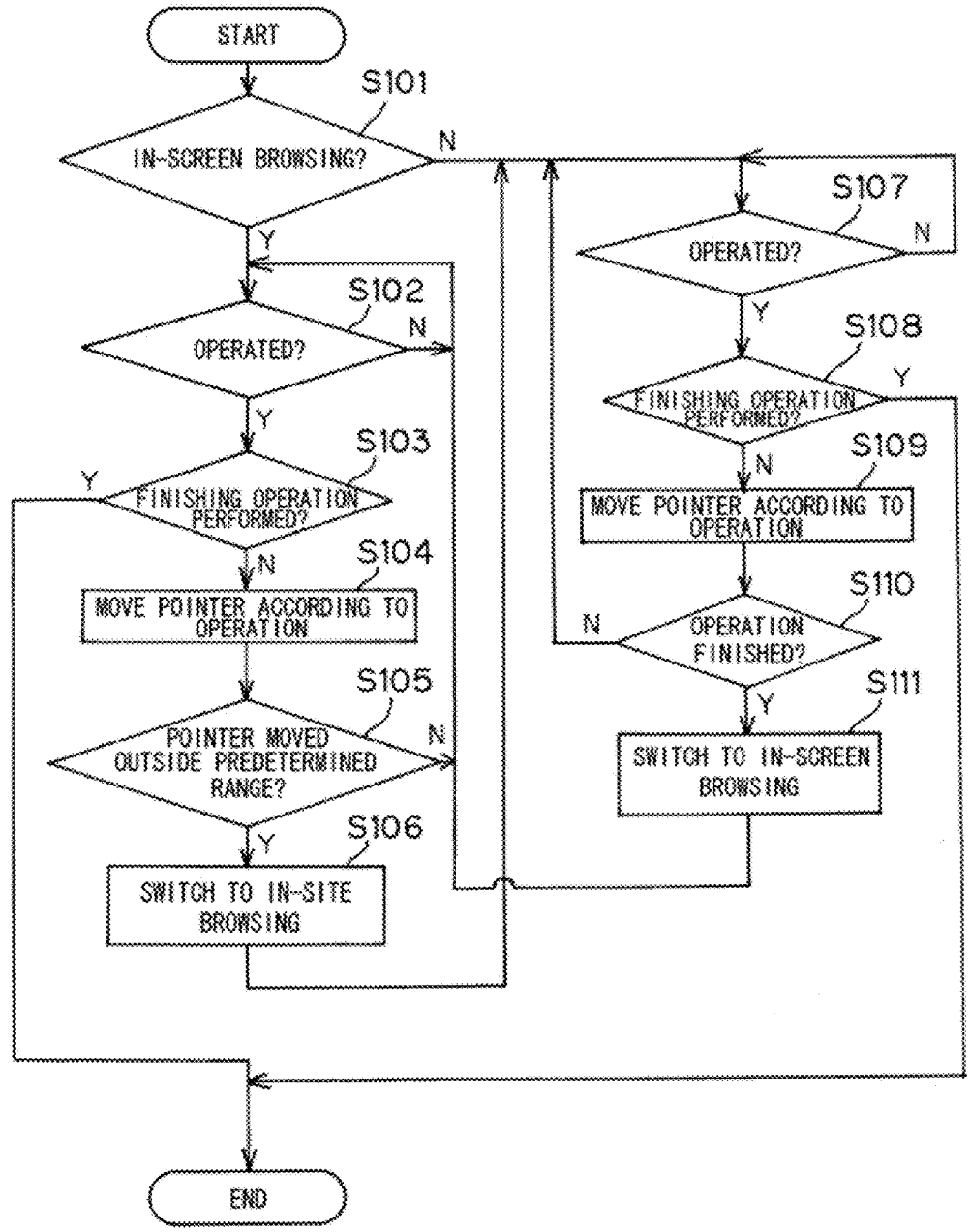
FIG. 4 is a flowchart explaining an operation of switching a method of changing (moving) a region to be displayed on the screen.

FIG. 4 is a flowchart explaining an operation of switching a method of changing (moving) a region to be displayed on the screen. FIGS. 5A to 5D are an explanatory diagrams showing the operation of switching the method of changing (moving) the region to be displayed on the screen from the in-screen browsing to the in-site browsing. FIGS. 6A to 6D are an explanatory diagrams showing the operation of switching the method of changing (moving) the region to be displayed on the screen from the in-site browsing to the in-screen browsing.

Figure 5A:
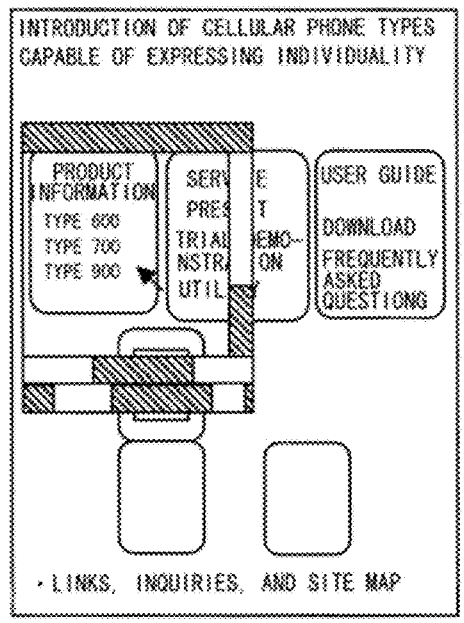
FIGS. 5A to 5D are explanatory diagrams showing an operation of switching the method of changing (moving) the region to be displayed on the screen from the in-screen browsing to the in-site browsing.

When the user performs the predetermined operations on the pointing device 3, cross key 4, dial keys 5, and the like for displaying the web page on the screen by the in-screen browsing (Y in step S101), the control unit causes superimposed display of the information within the predetermined range (within the window display frame) on the web page and the pointer on the screen, as shown in FIG. 5A.

Figure 5B:
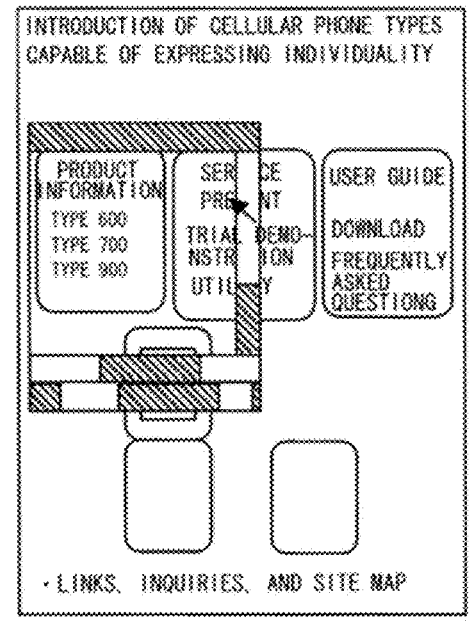

When the user performs the operation that causes the pointing device 3 to slide to the right and depresses the right button included in the cross key 4 (Y in step S102), the control unit moves the position where the pointer is displayed to the right, as shown in FIG. 5B (in step S104). When the user performs predetermined operations on the pointing device 3, cross key 4, dial keys 5, and the like for finishing display of the web page (Y in step S103), the control unit finishes display of the web page.

Figure 5C:
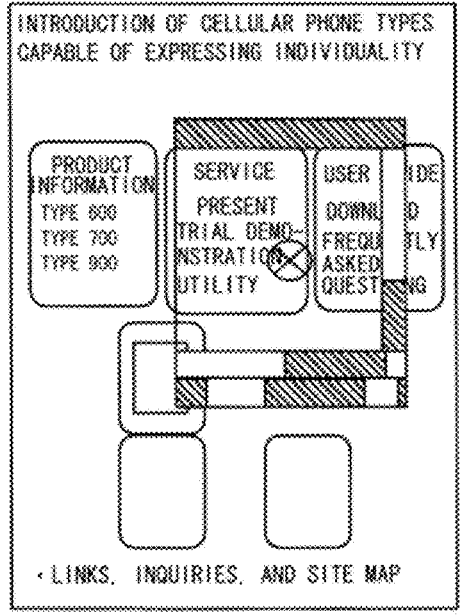

When the pointer is moved outside the predetermined range (outside the window display frame) by performing the operation that causes the pointing device 3 to slide to the right and depressing the right button included in the cross key 4 by the user (Y in step S105), the control unit performs switching from the in-screen browsing to the in-site browsing, as shown in FIG. 5C. Then, the control unit moves the region of the web page to be displayed on the screen to the right, and causes superimposed display of an omni-directional pointer on the center of a window (in step S106). The omni-directional pointer is a pointer indicating the center of the window.

Figure 5D:
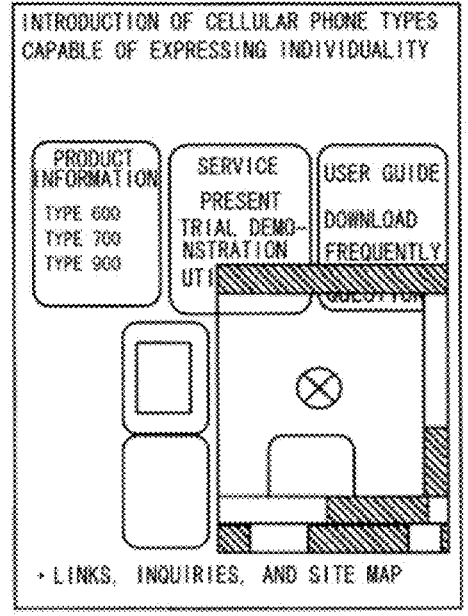

Further, when the user performs the operation that causes the pointing device 3 to slide to the lower right and depresses the right button and the down button included in the cross key 4 (Y in step S107), the control unit moves the region of the web page to be displayed on the screen to the lower right, as shown in FIG. 5D (in step S109). When the user performs predetermined operations on the pointing device 3, cross key 4, dial keys 5, and the like for finishing display of the web page (Y in step S108), the control unit finishes display of the web page.

Figure 6A:
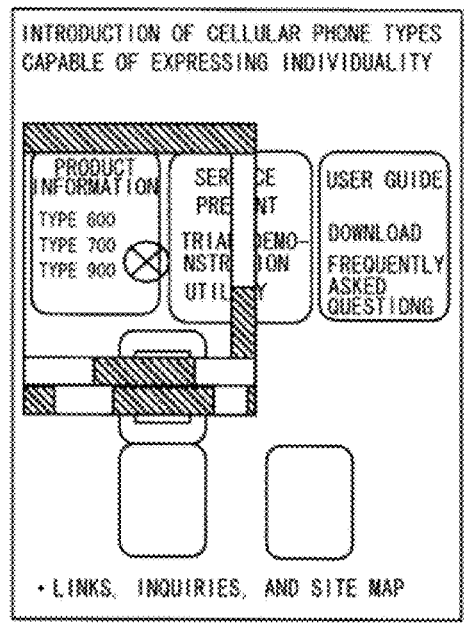
FIGS. 6A to 6D are explanatory diagrams showing an operation of switching the method of changing (moving) the region to be displayed on the screen from the in-site browsing to the in-screen browsing.

When the user further performs the operation on the pointing device 3 and depresses one of the buttons included in the cross key 4 (N in step S110, Y in step S107, or N in step S108), the control unit continues the in-site browsing, and moves the region of the web page to be displayed on the screen, as shown in FIG. 6A (in step S109).

Figure 6B:
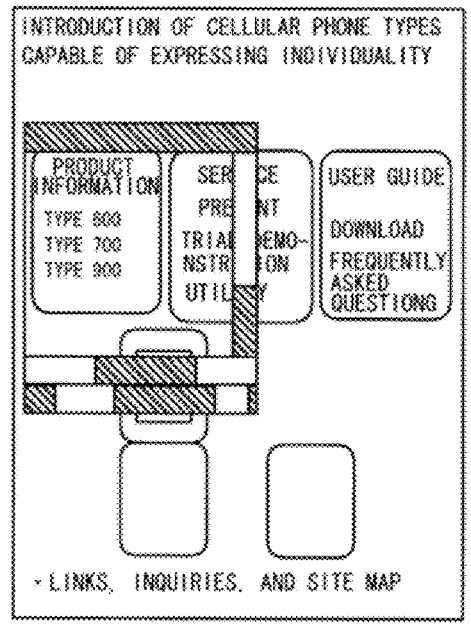
Figure 6C:
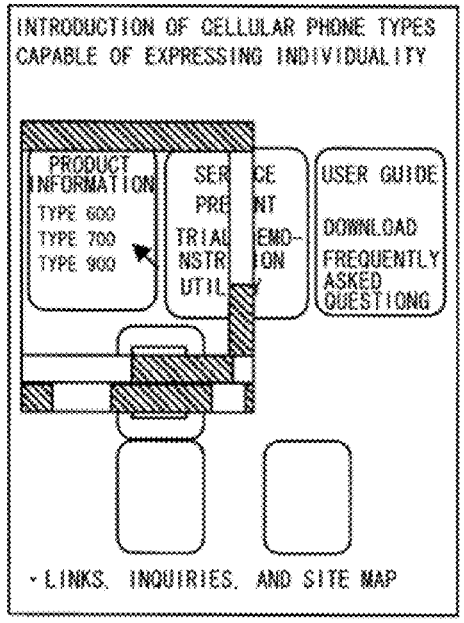

When the operation on the pointing device 3 and depression of the button included in the cross key 4 are finished by the user (Y in step S110), the control unit finishes superimposed display of the omni-directional pointer, as shown in FIG. 6B. Then, when the user performs the operation that causes the pointing device 3 to slide downward and depresses the down button included in the cross key 4, the control unit performs switching from the in-site browsing to the in-screen browsing, and performs superimposed display of the pointer, as shown in FIG. 6C (in step S111).

Figure 6D:
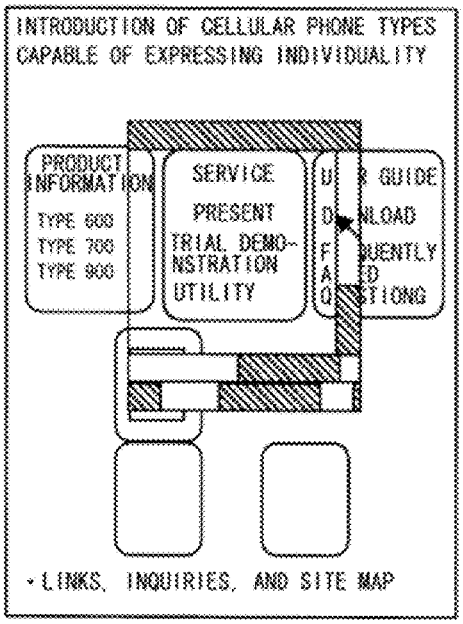

Further, when the user performs the operation that causes the pointing device 3 to slide to the right and depresses the right button included in the cross key 4 (Y in step S102 and N in step S103), the control unit changes the position at which the pointer is displayed to the right, as shown in FIG. 6D (in step S104).

Figure 7A:
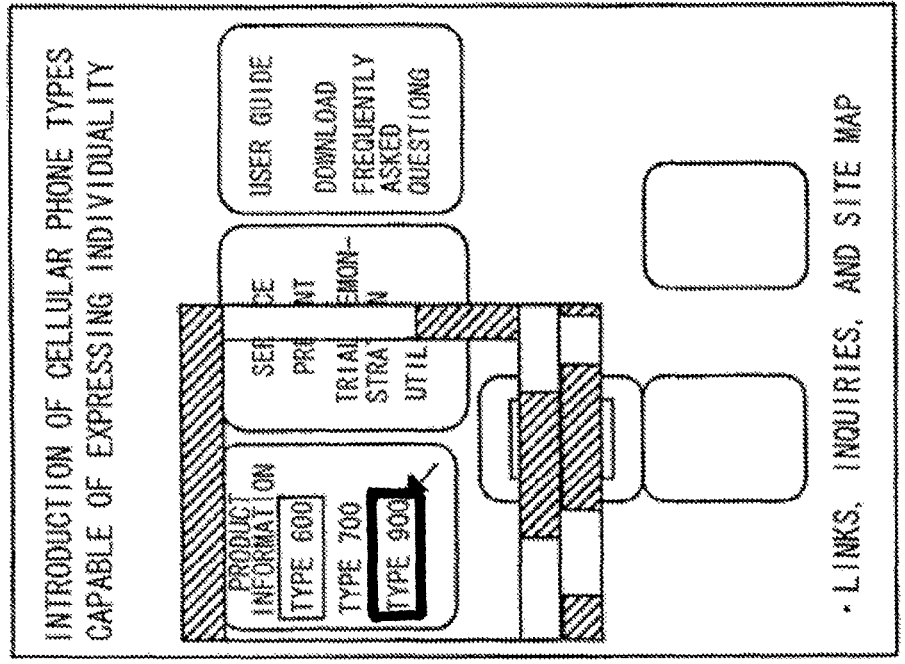
FIGS. 7A and 7B are explanatory diagrams showing an operation of anchoring to a link in the in-screen browsing.
Figure 7B:
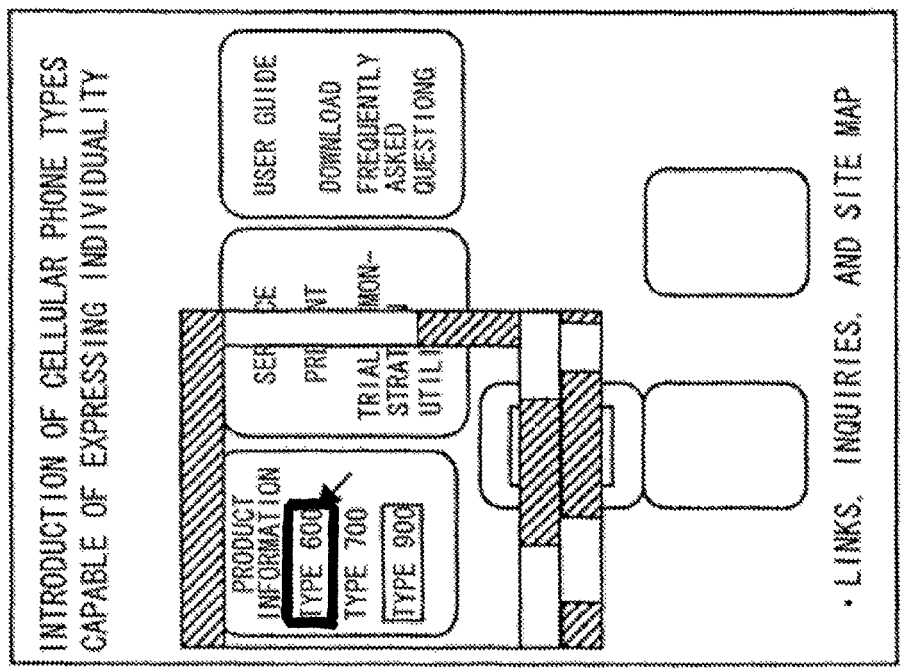

Next, an anchoring operation in each browsing will be described. FIGS. 7A and 7B are an explanatory diagrams showing an operation of anchoring to a link in the in-screen browsing. As shown in FIG. 7A, the control unit causes superimposed display of the information within the predetermined range (within the window display frame) of the web page and the pointer on the screen, thereby changing display of the link in the vicinity of the pointer on the web page. In the example shown in FIG. 7A, "600 type" is displayed in boldface type.

Then, when the user performs the operation that causes the pointing device 3 to slide to the lower left and depresses the left button and the down button included in the cross key 4, the control unit changes the position at which the pointer is displayed downwards, thereby changing display of the link in the vicinity of the pointer on the web page, as shown in FIG. 7B in the example in FIG. 7B, "900 type" is displayed in boldface type.

When a selecting operation such as depression of the pointing device 3 is performed by the user with link display changed, the control unit performs an operation corresponding to content connected by the link. Specifically, the control unit causes displays of another web page on the screen, for example. In this exemplary embodiment, change of link display is referred to as execution of the anchoring operation.

Figure 8A:
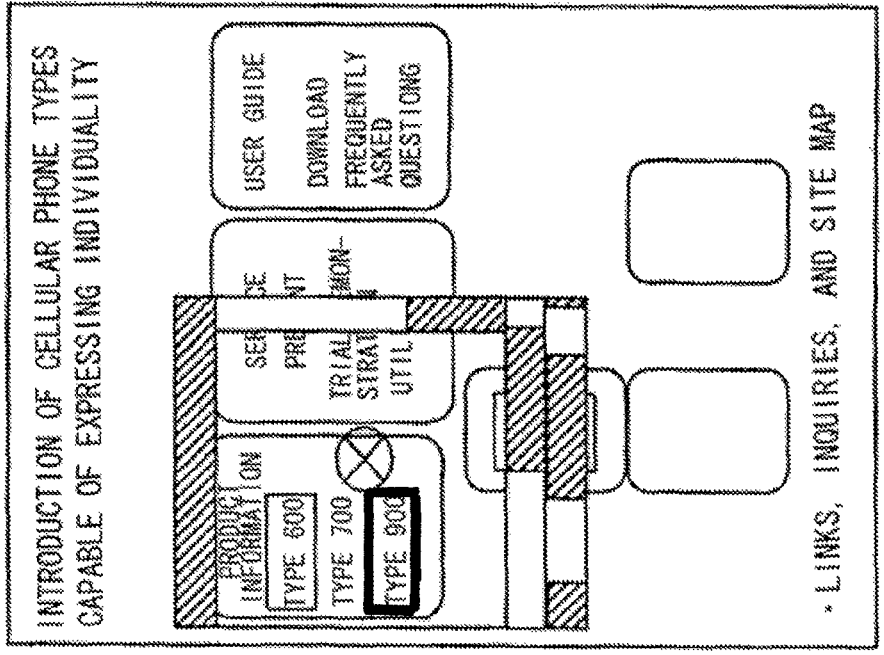
FIGS. 8A and 8B are explanatory diagrams showing an operation of anchoring to the link in the in-site browsing.
Figure 8B:
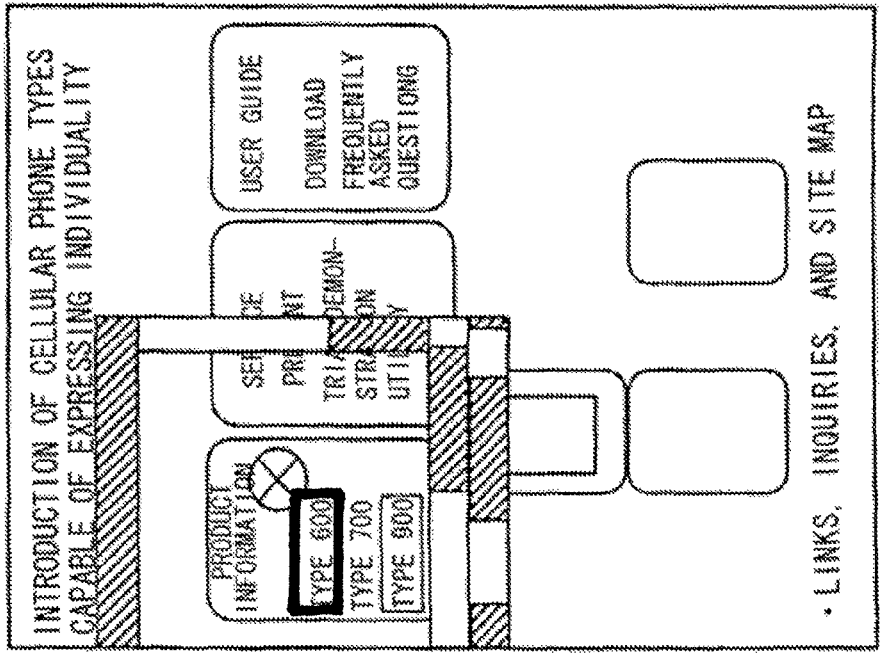

FIGS. 8A and 8B are explanatory diagrams showing an operation of anchoring to the link in the in-site browsing. As shown in FIG. 8A, the control unit causes superimposed display of information within a predetermined range (within the window display frame) of the web page and the omni-directional pointer on the screen, thereby changing display of the link in the vicinity of the omni-pointer on the web page. In the example shown in FIG. 8A, "600 type" is displayed in bold face type. Incidentally, the omni-directional pointer is displayed in the center of the window.

Then, when the user performs the operation that causes the pointing device 3 to slide to the lower left and depresses the left button and the down button included in the cross key 4, the control unit moves the region of the web page to be displayed on the screen to the lower right, thereby changing display of the link in the vicinity of the omni-directional pointer on the web page, as shown in FIG. 8B. In the example in FIG. 8B, "900 type" is displayed in boldface type. The control unit constantly performs superimposed display of the omni-directional pointer in the center of the window.

In this exemplary embodiment, switching between the in-screen browsing and the in-site browsing is performed. Thus, in the in-screen browsing, the operation of anchoring to a link can be readily performed. In the in-site browsing, the screen can be smoothly moved.

When the pointer is moved outside the region in the in-screen browsing, transition to the in-site browsing is made. Then, when the operations performed by the user are finished in the in-site browsing, transition to the in-screen browsing is made. Thus, the in-site browsing and the in-screen browsing can be mutually switched without making the user aware of the switching.

In this exemplary embodiment, the web page is used as an example of the information targeted for browsing. The present invention may also be applied to a case where information other than the web page is targeted. Also when an image obtained by image pickup unit, a file received through a communication network or received through detachable storage unit (such as a PDF format file or a text file), a received mail, a transmitted mail, or the like is displayed on the display 2, for example, the present invention can be applied.

Modifications and adjustments of the exemplary embodiment and embodiments are possible within the scope of the overall disclosure (including claims) of the present invention, and based on the basic technical concept of the invention. Various combinations and selections of various disclosed elements are possible within the scope of the claims of the present invention.

Industrial Applicability

The present invention can be applied to a cellular phone and a PHS (Personal Handy phone System) that display a web page. The present invention can also be applied to a portable audio device, a portable game device, an electronic dictionary, a portable TV terminal, and the like that include a function of displaying a web page. A common point among these devices is that information to be browsed having a size that cannot be held in a display region is often displayed due to their portability. It goes without saying that the present invention can also be applied to devices other than those described above.

What is claimed is:

1. A portable communication terminal comprising:
a display unit displaying information targeted for browsing on a screen thereof,
an instruction unit instructing a region of the information to be displayed on the display unit according to an operation performed by a user; and
a control unit causing the region of the information corresponding to the operation performed on the instruction unit to be displayed on the display unit,
wherein
the control unit causes, in a first state, superimposed display of the information and a pointer that moves according to the operation performed on the instruction unit on the display unit and changes the region of the information to be displayed on the display unit towards a direction in which said pointer is moved from a center of the region when the pointer moves outside the region, and
changes, in a second state, the region of the information to be displayed on the display unit toward the instructed direction by the operation performed on the instruction unit; and
the control unit includes a state transition unit causing transition from the first state to the second state and causing transition from the second state to the first state,
and wherein said control unit changes display of a link in the vicinity of the pointer in the first state, and
said control unit changes display of the link in the vicinity of an omni-direction pointer which is superimposed on a center of the region of the displayed information in the second state, and
wherein the transition from the first state to the second state comprises changing display of the pointer to display of the omni-direction pointer, and the transition from the second state to the first state comprises changing display of the omni-direction pointer to display of the pointer.

2. The portable communication terminal according to claim 1, wherein
the control unit changes the region of the information targeted for browsing to be displayed on the display unit when the pointer moves outside the region in the first state; and
the state transition unit causes transition to the second state when the pointer moves outside the region in the first state.

3. The portable communication terminal according to claim 1, wherein the state transition unit causes transition to the first state when the operation performed on the instruction unit is finished in the second state.

4. The portable communication terminal according to claim 1, wherein the information targeted for browsing is a web page.

5. A browsing method of displaying information targeted for browsing on a display apparatus according to an operation performed on an instruction unit by a user, comprising:

a control step of displaying on the display apparatus a region of the information corresponding to the operation performed on the instruction unit, wherein, in a first state, superimposed display of the information and a pointer that moves according to the operation performed on a screen of the display apparatus is made on the a screen of the display apparatus and the region of the information to be displayed on the screen of the display apparatus is changed towards a direction in which said pointer is moved from a center of the region when the pointer moves outside the region, and in a second state, the region of the information to be displayed on the screen of the display apparatus is changed toward the instructed direction by the operation performed on the instruction unit; and a transition step of changing the region of the information to be displayed on the screen of the display apparatus when the pointer moves outside the region in the first state, thereby causing transition to the second state, and causing transition to the first state when the operation performed on the instruction unit is finished in the second state, and wherein said control step changes display of a link in the vicinity of the pointer in the first state, and said control step changes display of the link in the vicinity of an omni-direction pointer which is superimposed on a center of the region of the displayed information in the second state, and wherein the transition from the first state to the second state comprises changing display of the pointer to display of the omni-direction pointer, and the transition from the second state to the first state comprises changing display of the omni-direction pointer to display of the pointer.

6. A non-transitory recording medium storing a browsing program installed in a portable communication terminal including display unit displaying information targeted for browsing on a screen thereof, the browsing program causing a computer to execute a control process that causes a region of the information corresponding to an operation performed on instruction unit by a user to be displayed on the display unit, in a first state of the control process, superimposed display of the information and a pointer that moves according to the operation performed on the instruction unit being made on the display unit, and the region of the information to be displayed on the display unit being changed towards a direction in which said pointer is moved from a center of the region when the pointer moves outside the region; and in a second state of the control process, the region of the information to be displayed on the display unit being changed toward the instructed direction by the operation performed on the instruction unit, and wherein in the first state, display of a link is changed in the vicinity of the pointer, and in the second state, display of the link is changed in the vicinity of an omni-direction pointer which is superimposed on a center of the region of the displayed information, and wherein in a transition to the second state from the first state, display of the pointer is changed to display of the omni-direction pointer, and in a transition from the first state from the second state, display of the omni-direction pointer is changed to display of the pointer.

7. The non-transitory recording medium according to claim 6, wherein the browsing program causes the computer to execute the control process so that when the pointer moves outside the region in the first state, the region of the information targeted for browsing to be displayed on the display unit is changed, thereby causing the transition to the second state, and when the operation performed on the instruction unit is finished in the second state, the transition to the first state is caused.

8. A portable terminal capable of performing switching when information targeted for browsing that cannot be held in a display region is displayed, the switching being performed between:

a first browsing mode in which, when a pointer operated by a user moves outside the display region, a location of the display region of the information targeted for browsing is moved towards a direction in which said pointer is moved from a center of the region; and a second browsing mode in which the location of the display region of the information targeted for browsing is moved towards the instructed direction by an operation amount of the user, and wherein in the first browsing mode, display of a link is changed in the vicinity of the pointer, and in the second browsing mode, display of the link is changed in the vicinity of an omni-direction pointer which is superimposed on a center of the region of the displayed information, and wherein in a transition to the second browsing mode from the first browsing mode, display of the pointer is changed to display of the omni-direction pointer, and in a transition from the first browsing mode from the second browsing mode. display of the omni-direction pointer is changed to display of the pointer.

9. The portable terminal according to claim 8, wherein when the pointer moves outside the display region in the first browsing mode, the display region is moved and transition to the second browsing mode is made.

10. The portable terminal according to claim 8, wherein when a pointer operation is finished in the second browsing mode, transition to the first browsing mode is made.

11. A non-transitory recording medium storing a browsing program installed in a portable terminal and executed by a computer, the browsing program implementing a function of performing switching when information targeted for browsing and having a size that cannot be held in a display region of the portable terminal is displayed, the switching is performed between:

a first browsing mode in which, when a pointer operated by a user is moved outside the display region, a location of the display region of the information targeted for browsing is moved towards a direction in which said pointer is moved from a center of the region; and a second browsing mode in which the display region is moved towards the instructed direction an operation amount of the user, and wherein in the first browsing mode, display of a link is changed in the vicinity of the pointer, and in the second browsing mode, display of the link is changed in the vicinity of an omni-direction pointer which is superimposed on a center of the region of the displayed information, and wherein in a transition to the second browsing mode from the first browsing mode, display of the pointer is changed to display of the omni-direction pointer, and in a transition from the first browsing mode from e second browsing mode, display of the omni-direction pointer is changed to display of the pointer.

\* \* \* \* \*